No. 734,106. PATENTED JULY 21, 1903.
J. S. THOMPSON.
LINOTYPE MACHINE.
APPLICATION FILED FEB. 13, 1903.
NO MODEL. 13 SHEETS—SHEET 1.
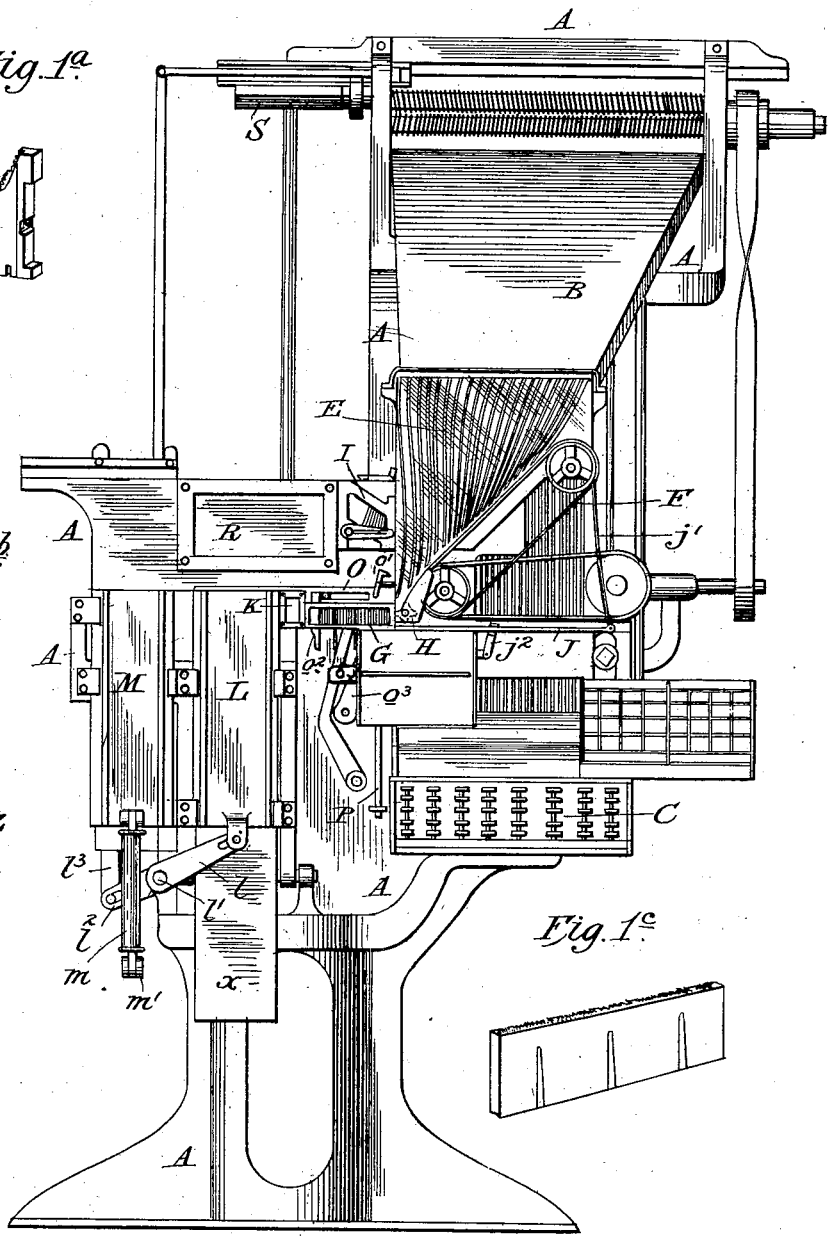
Fig. 1.
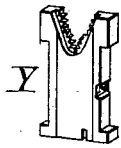
Fig. 1ª.
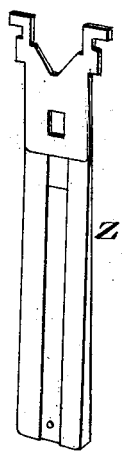
Fig. 1ᵇ.
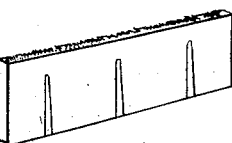
Fig. 1ᶜ.
Witnesses:
J. B. Weir
N. R. Kennedy
Inventor
John S. Thompson
By P. T. Dodge
Atty.
THE NORRIS PETERS CO., PHOTO-LITHO., WASHINGTON, D. C.

No. 734,106. PATENTED JULY 21, 1903.
J. S. THOMPSON.
LINOTYPE MACHINE.
APPLICATION FILED FEB. 13, 1903.
NO MODEL. 13 SHEETS—SHEET 3.

Witnesses:
J B Weir
W. B. Kennet

Inventor
John S. Thompson
By P. T. Dodge
Att.

No. 734,106. PATENTED JULY 21, 1903.
J. S. THOMPSON.
LINOTYPE MACHINE.
APPLICATION FILED FEB. 13, 1903.
NO MODEL. 13 SHEETS—SHEET 5.

ON LINE 5-5.

Witnesses
J. B. Weir
N. R. Kennedy

Inventor
John S. Thompson
B. P. T. Dodge Atty

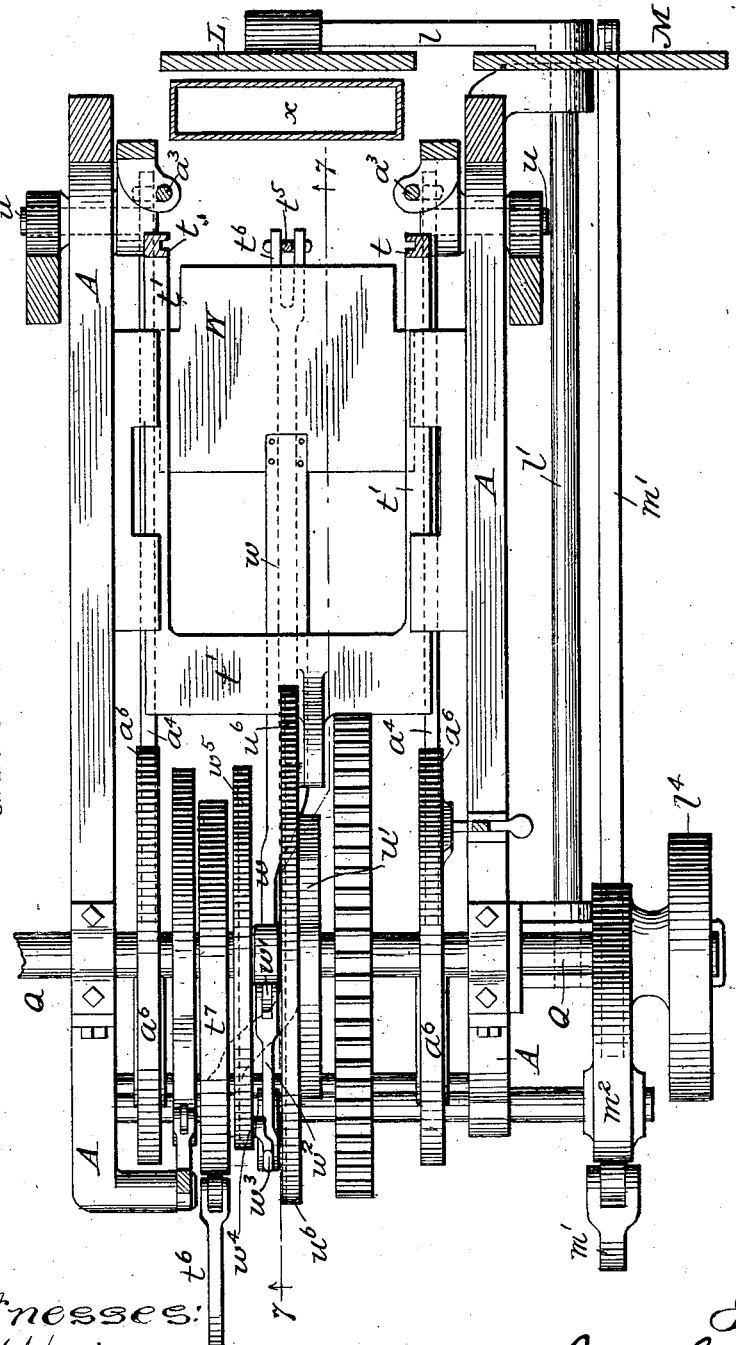

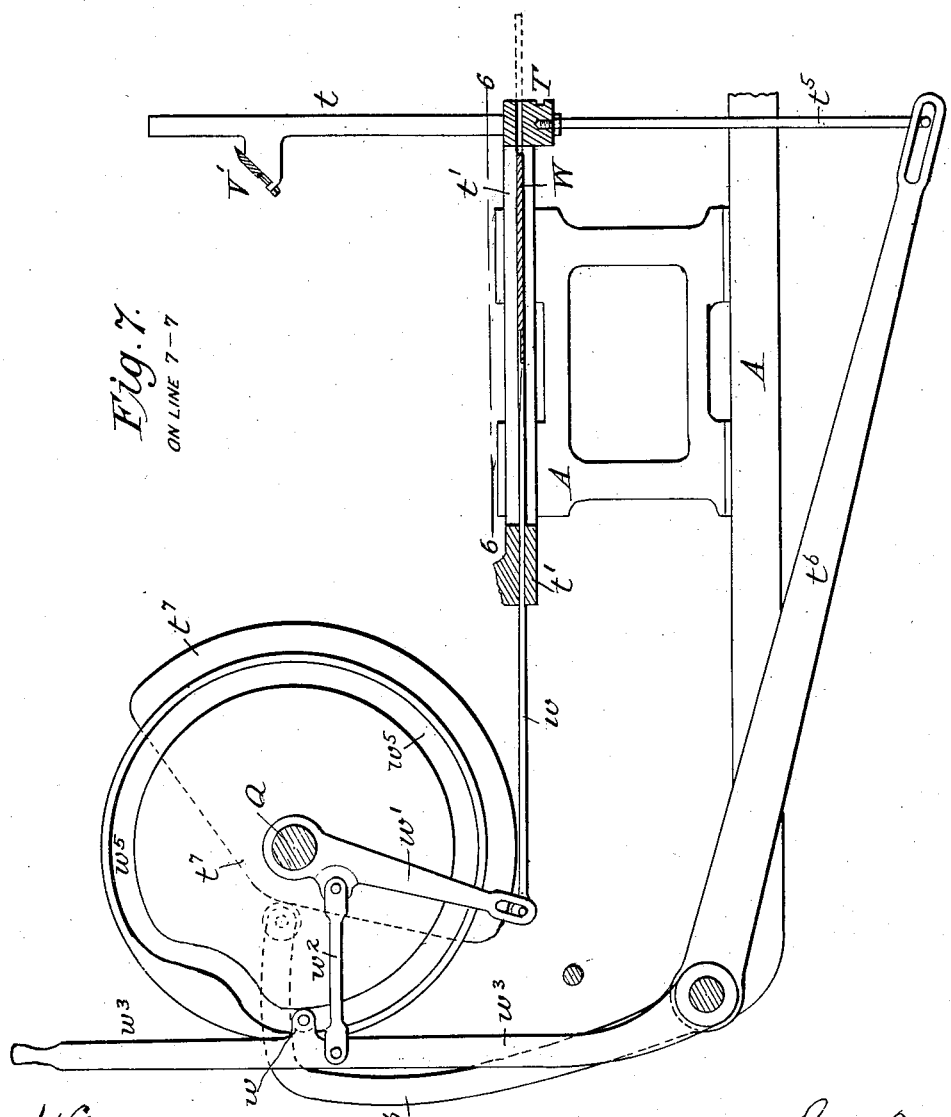

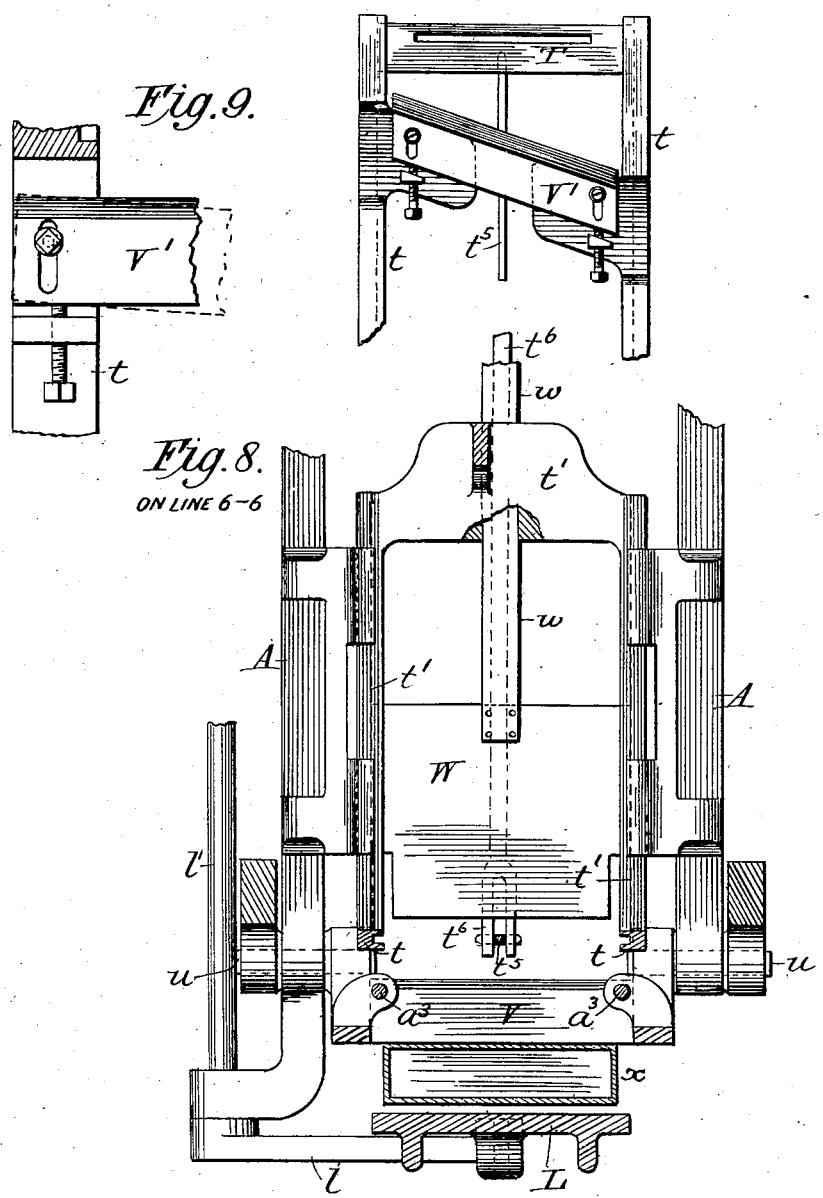

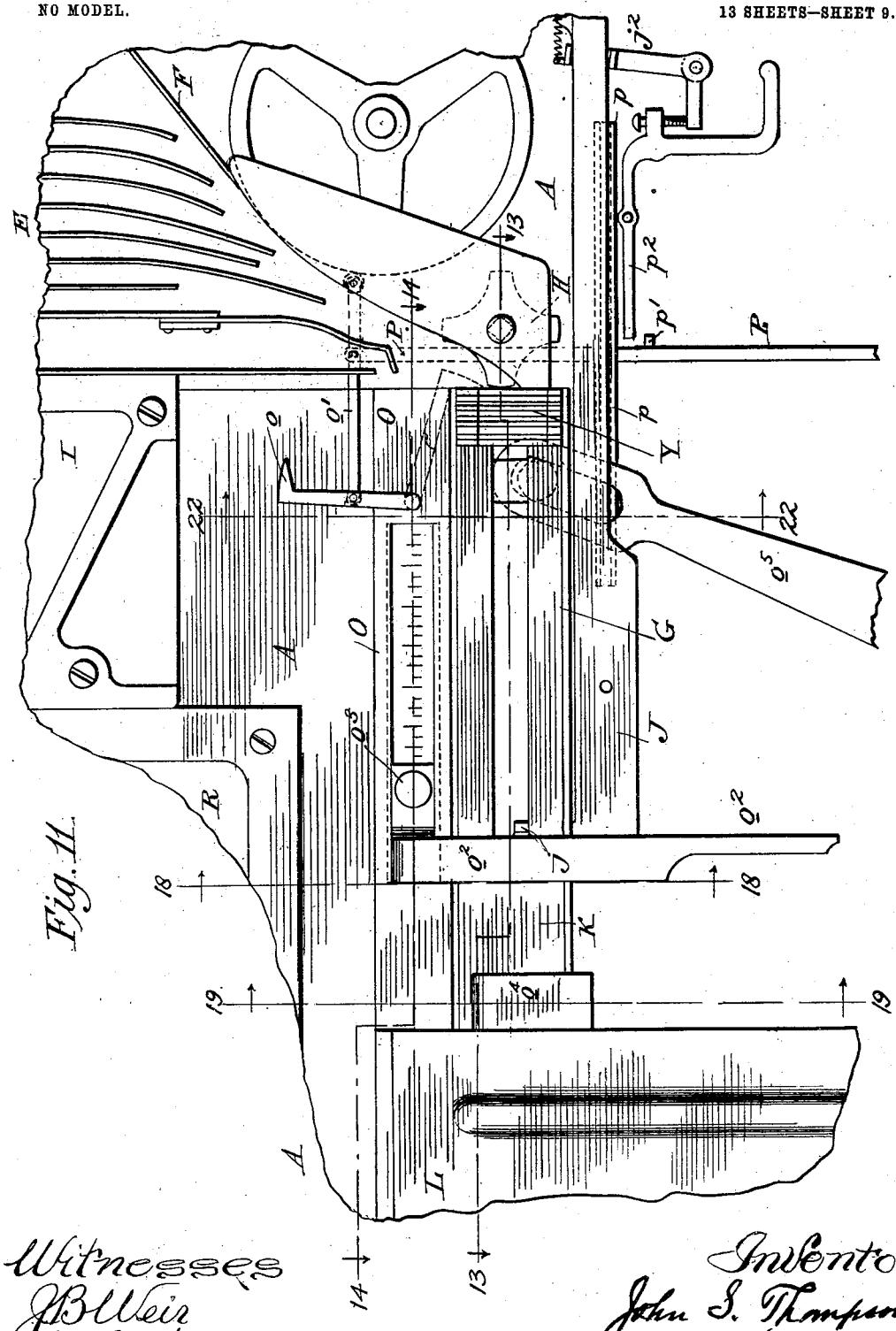

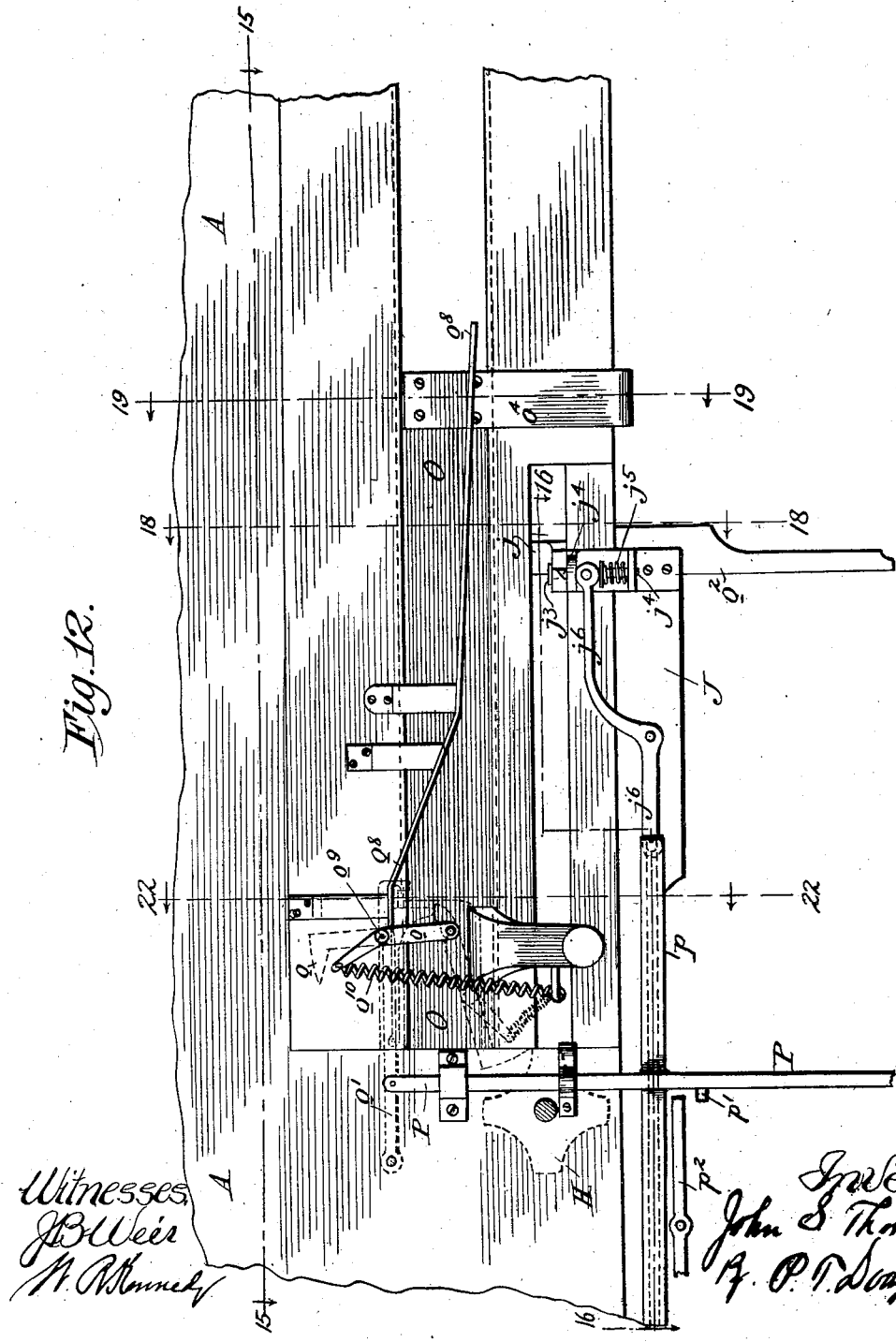

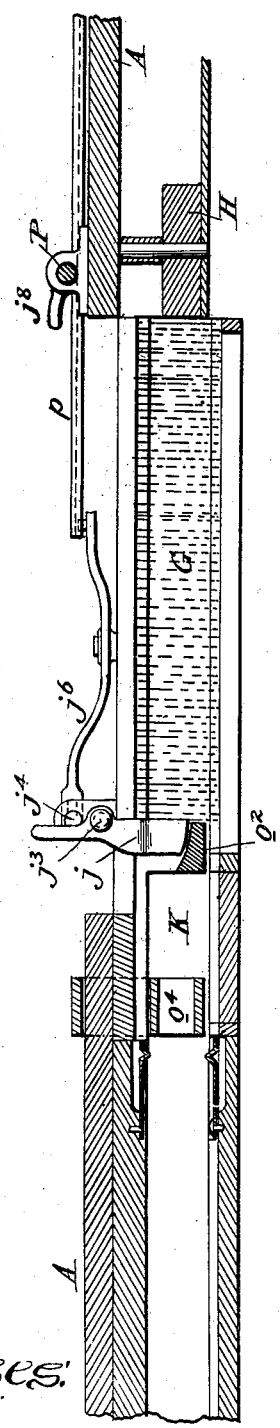
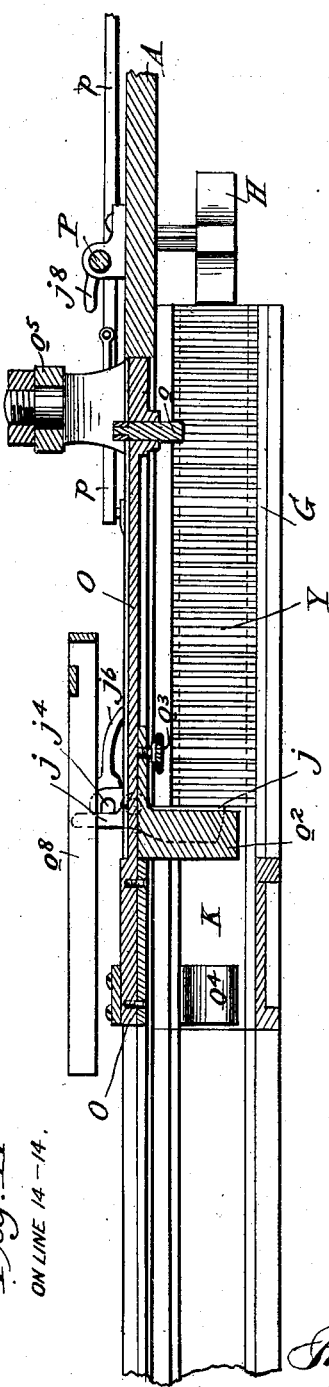

No. 734,106. PATENTED JULY 21, 1903.
J. S. THOMPSON.
LINOTYPE MACHINE.
APPLICATION FILED FEB. 13, 1903.
NO MODEL. 13 SHEETS—SHEET 12.
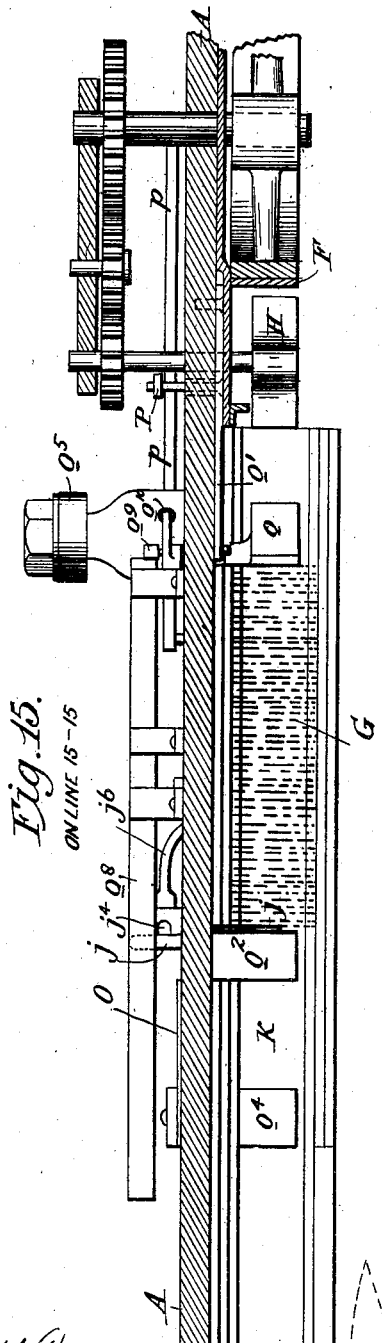
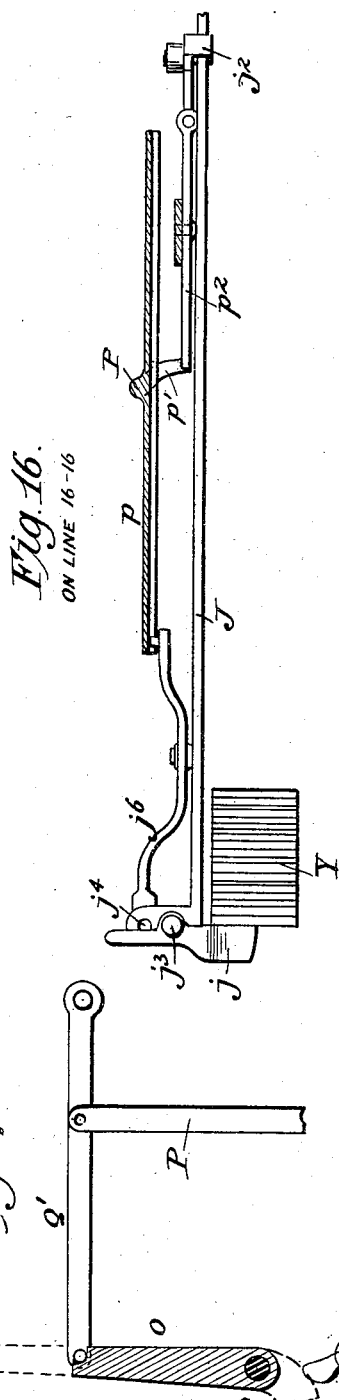
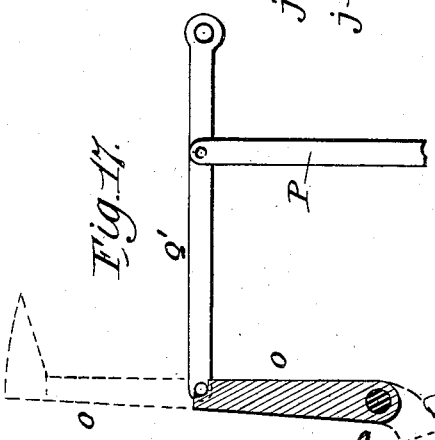

No. 734,106. PATENTED JULY 21, 1903.
J. S. THOMPSON.
LINOTYPE MACHINE.
APPLICATION FILED FEB. 13, 1903.
NO MODEL.
13 SHEETS—SHEET 13.

ON LINE 18-18.

ON LINE 19-19.

ON LINE 20-20.

ON LINE 22-22.

ON LINE 21-21.

Witnesses
Inventor
John S. Thompson
By P. T. Dodge Atty.

No. 734,106.

Patented July 21, 1903.

UNITED STATES PATENT OFFICE.

JOHN S. THOMPSON, OF CHICAGO, ILLINOIS, ASSIGNOR TO MERGENTHALER LINOTYPE COMPANY, A CORPORATION OF NEW YORK.

LINOTYPE-MACHINE.

SPECIFICATION forming part of Letters Patent No. 734,106, dated July 21, 1903.

Application filed February 13, 1903. Serial No. 143,203. (No model.)

*To all whom it may concern:*

Be it known that I, JOHN S. THOMPSON, of Chicago, county of Cook, and State of Illinois, have invented a new and useful Improvement in Linotype-Machines, of which the following is a specification.

My invention has reference to linotype-machines of the character represented in United States patent to Mergenthaler, No. 557,000, wherein matrices representing the various characters and expanding spacers are stored in magazines, released individually in the required order through the action of finger-keys, the released matrices and spacers assembled in line, the composed line transferred to the face of a slotted mold and there justified, and the mold finally filled with type-metal from a melting-pot to produce the slug or linotype, after which the slug is ejected from the mold and the series of matrices returned to the top of the magazine through a distributing mechanism, while the spacers are separately returned to their magazine.

The aim of the invention is to increase the speed of the machine, simplify certain of its parts and actions, and reduce its size.

Figure 2:
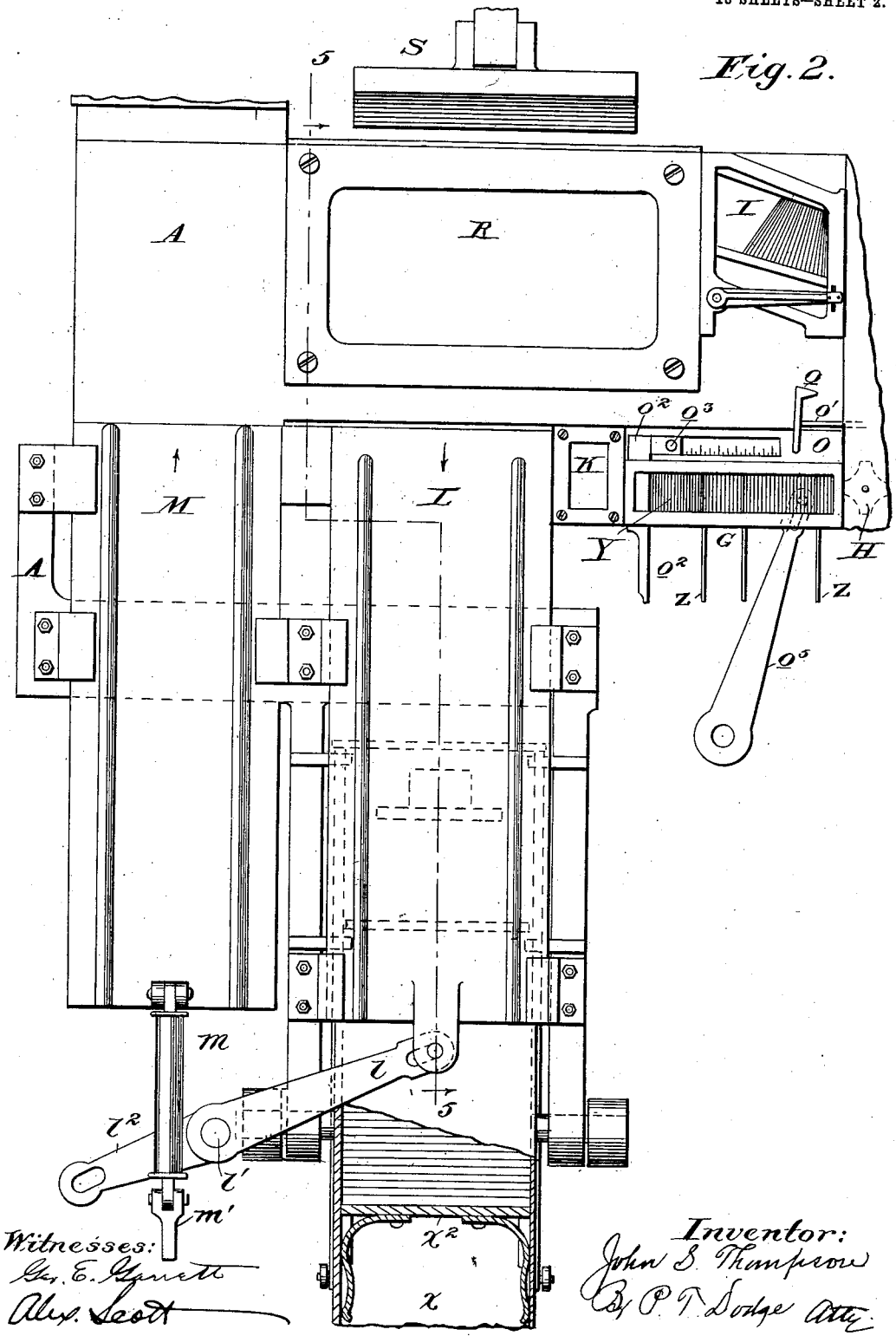
Figure 3:
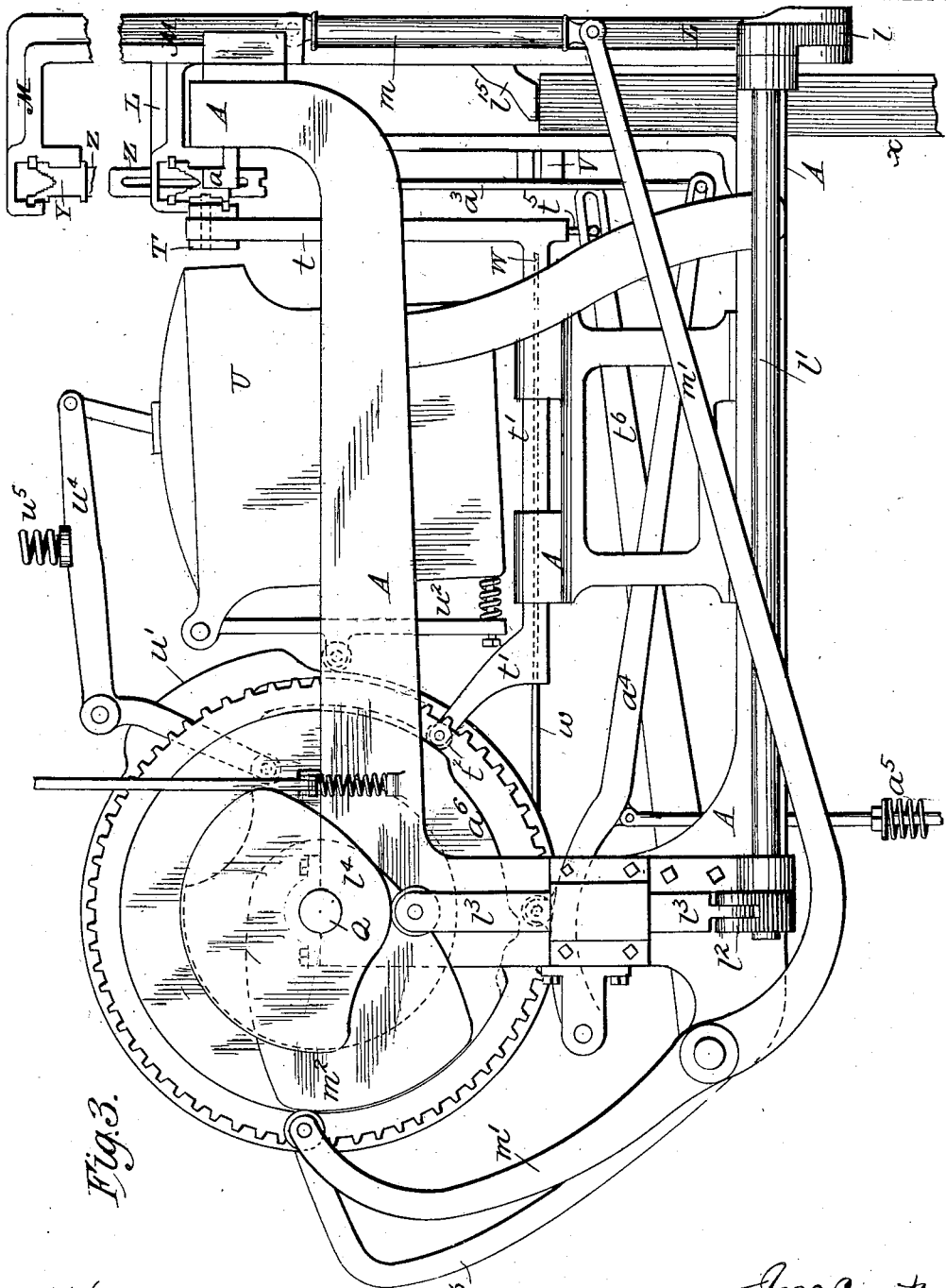
Figure 4:
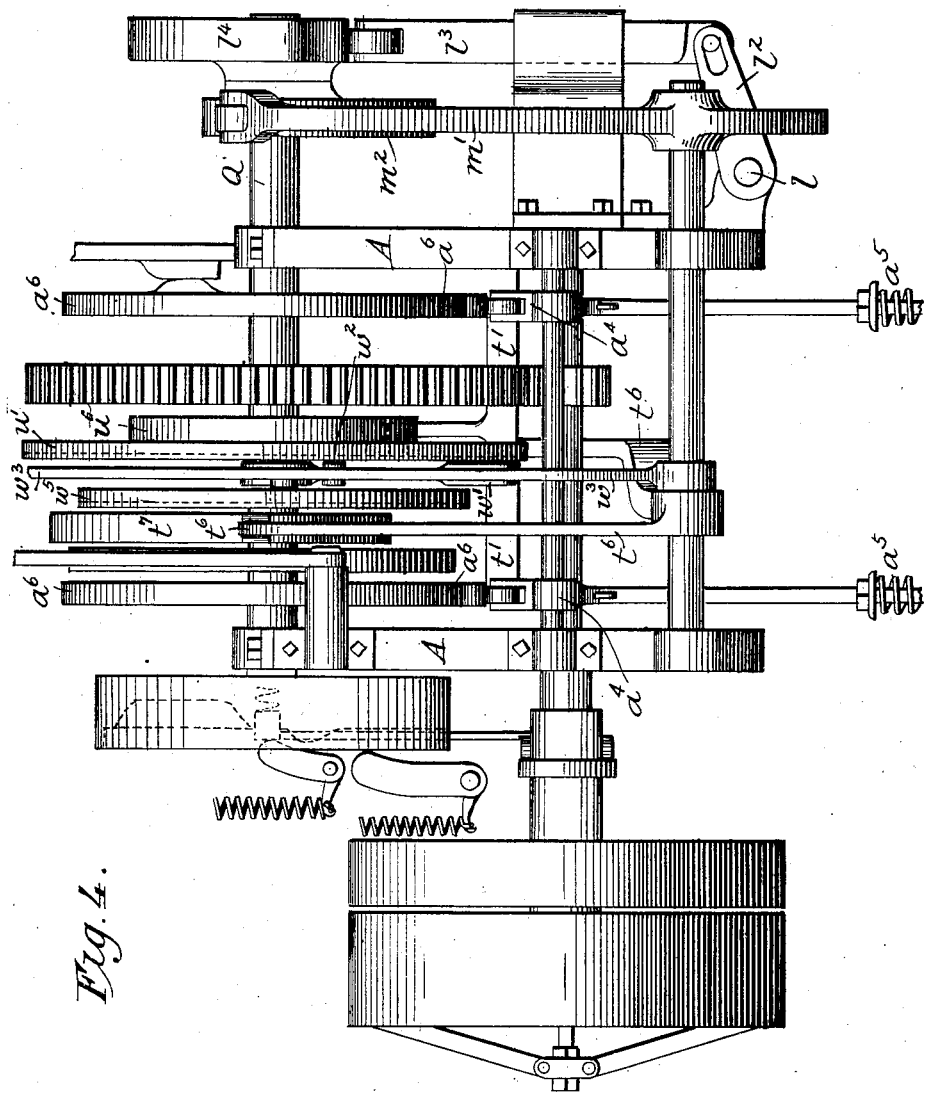
Figure 5:
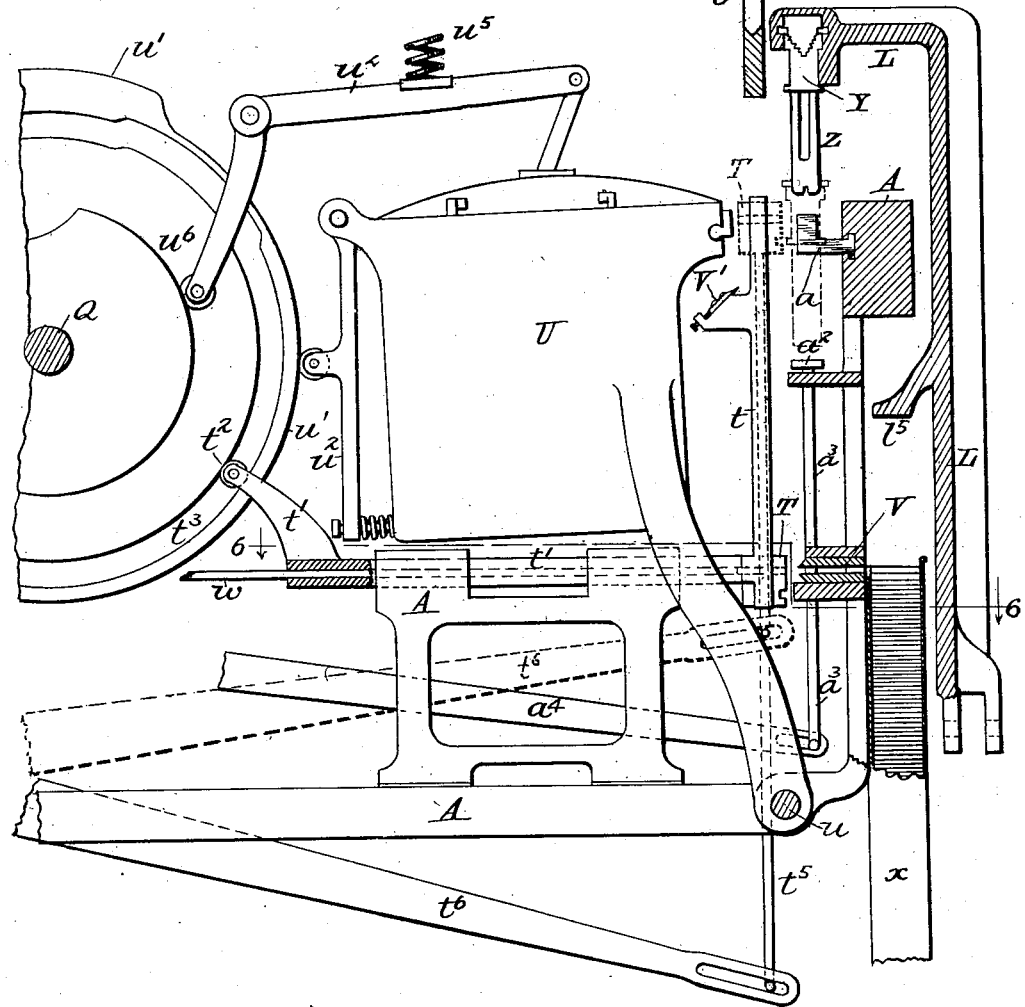
Figure 18:
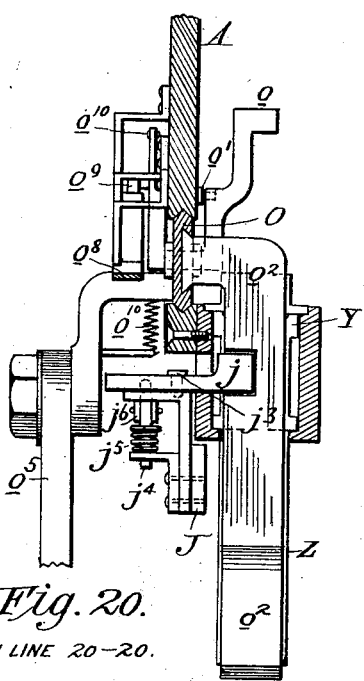
Figure 19:
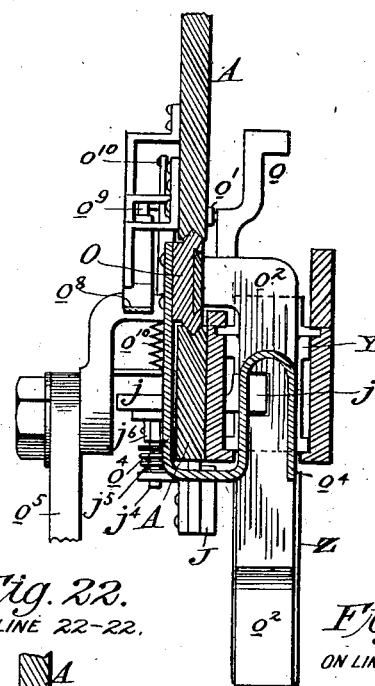
Figure 20:
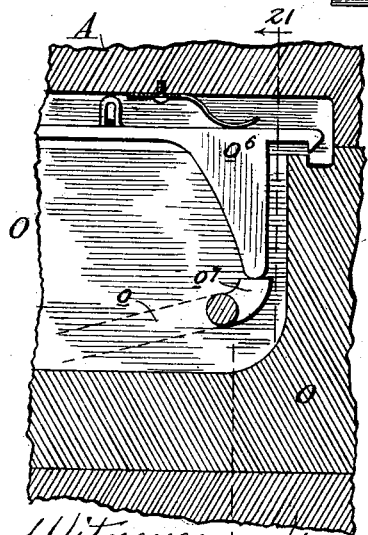
Figure 22:
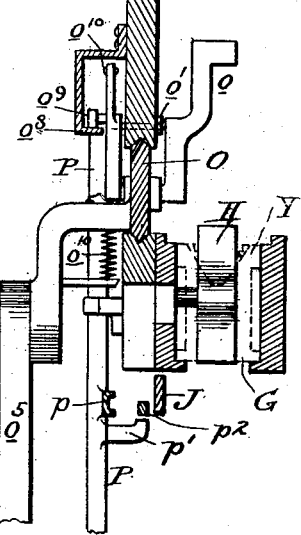
Figure 21:
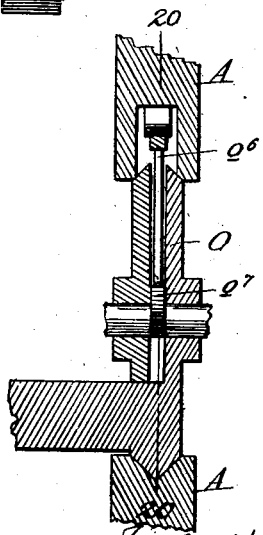

Figure 1 represents a front elevation of my improved machine. Fig. 1ª is a view of one of the matrices used in the machine. Fig. 1ᵇ is one of the expanding wedge spacers employed to justify the lines. Fig. 1ᶜ is a linotype or printing-bar, the product of the machine. Fig. 2 is a front elevation showing the assembling devices and line-carrying mechanism on an enlarged scale. Fig. 3 is a side elevation looking from the left of the principal operative parts. Fig. 4 is a rear elevation, on a large scale, of the principal driving-cams and coöperating parts. Fig. 5 is a side elevation of the melting-pot, mold, and adjacent parts with the forward end of the mold in vertical section on the line 5 5 of Fig. 2. Fig. 6 is a horizontal section on the line 6 6 of Fig. 5, showing the ejector, the mold-support, and various operative parts. Fig. 7 is a vertical section through the mold, ejector, and base-trimming knife with the operating devices shown in side elevation. Fig. 8 is a horizontal section similar to Fig. 6 looking downward on the ejector and attendant parts. Fig. 9 is a rear elevation, on a large scale, of one end of the knife for trimming the base of the slug. Fig. 10 is a view, on a smaller scale, of the knife, the mold, and mold-guide. Fig. 11 is a front view, on an enlarged scale, of the assembling devices and attendant parts. Fig. 12 is a rear elevation of the same parts. Fig. 13 is a horizontal section through the assembling devices on the line 13 13 of Fig. 11 looking in a downward direction. Fig. 14 is a horizontal section through the assembling devices on the line 14 14 of Fig. 11 looking in a downward direction. Fig. 15 is a horizontal section on the line 15 15 of Fig. 12 looking downward. Fig. 16 is a horizontal section on the line 16-16 of Fig. 12 looking downward. Fig. 17 is a side elevation of the line-transferring finger and its controlling device. Fig. 18 is a vertical cross-section through the assembling devices on the line 18 18 of Fig. 12. Fig. 19 is a vertical cross-section through the assembling devices on the line 19 19 of Fig. 12. Fig. 20 is a longitudinal vertical section on the line 20 20. Fig. 21, showing the device for releasing the line-transferring carriage. Fig. 21 is a cross-section on the line 21 21 of Fig. 20. Fig. 22 is a vertical cross-section on the line 22 22, Figs. 11 and 12.

The basic elements of the machine are a series of matrices Y, such as shown in Fig. 1ª, and a smaller series of expanding wedge spacers Z, such as shown in Fig. 1ᵇ, similar to those commonly used in the commercial linotype. Each matrix is provided in one edge with a letter or matrix proper, and in the upper end with a series of distributing-teeth, differing in arrangement from matrices containing different characters. Each spacer Z consists of two oppositely-tapered wedges connected by a sliding joint, the shorter wedge having ears whereby it may be sustained and held in the composed line of matrices while the other and longer member is pushed upward through the line to expand and justify the same.

The various mechanisms hereinafter described are intended to select the matrices Y and assemble them in line in proper order, together with the spacers Z, and present the composed line to a mold, so that they may form the letters or characters in relief on the edge of the resulting linotype or slug, such as shown at Fig. 1ᶜ, the general operation and result being the same as in the Mergenthaler machine.

Throughout this specification the expressions "line," "composed line," "assembled line," and "matrix-line" are synonymous. The expressions "linotype," "slug," and "printing-bar" are also synonymous.

Referring now to the general construction of the machine, A represents the rigid main frame, which may be of any form adapted to sustain the various operative parts.

B is the inclined fixed magazine to contain the matrices which are delivered into its upper end by the distributing mechanism and permitted to escape one at a time from the lower end by the usual escapement devices controlled by finger-keys C, representing the various characters. The matrices fall through guide-channels E to an inclined belt F, by which they are delivered successively to the stationary assembling-channel G, commonly known as the "assembler." As they approach the end of this assembler they are crowded forward therein by an angular rotary wheel H, commonly known as the "star-wheel."

I represents a magazine for the spacers Z, which are released therefrom one at a time by finger-key connections, so that they may fall to their proper places in the line in course of composition in the assembler G.

The foregoing parts may all be of the ordinary construction except that the assembler is fixed instead of being movable vertically, as usual.

For the purpose of holding the matrices in compact order as they are assembled the horizontal assembler-slide J is mounted in the frame and provided with a finger $j$, lying across the path of the incoming matrices, so that as the line elongates it pushes the slide and finger forward. The advance of the slide is resisted, as shown in Fig. 1, by a small spring $j'$. As the assembler is pushed forward by the line its retreat is prevented by the friction-dog $j^2$, Figs. 1 and 11, thus leaving a space between the star-wheel and the rear end of the line after it is pushed forward thereby for the admission of the incoming matrices, as in the ordinary linotype. After the composition of the line is completed it is pushed forward from the assembler G through a stationary channel K, (see Figs. 1 and 2,) forming a continuation thereof, into the channeled upper end of the vertically-movable carrier-slide L, commonly known as the "first elevator," whereby it is lowered to the casting-level and again raised to the original or assembling level, after which the line is pushed forward horizontally into the channeled upper end of a second slide or elevator M, forming a leading feature of my invention.

In the Mergenthaler machine the first elevator L after receiving the line carries it downward to the casting-level, sustains it during the casting operation, and finally raises it above the casting-level preparatory to the transfer of the line to the distributing devices. This mode of operation prevents a second line from being sent into the elevator and carried to the mold until the elevator has raised the line above the original level, as described. In this way the speed of the machine is limited and fast operators are frequently compelled to hold back a newly-composed line until the preceding line is disposed of. By the employment of the second elevator M, I overcome this difficulty. When a second line is carried from the assembler G into the first elevator L after it has risen from the casting position, the first line is at the same time pushed out of the elevator L into the second elevator M. As the first elevator descends with the second line the second elevator M rises, carrying the first line upward in position to be transferred to the distributing devices. It follows because the first elevator L has only a single function instead of a double function, as heretofore, that the lines may be transferred more rapidly and the machine operated at a higher speed.

I will now describe the mechanism for transferring the assembled lines to the respective elevators and thereafter the means for operating the elevators.

O represents a horizontal moving slide or carriage, mounted in the main frame and commonly known as the "transfer" carriage or slide. It is provided near one end with a vertically-swinging finger $o$, of hooked form, known as the "transfer-finger," standing normally in an elevated position, as shown in Figs. 1, 2, and 11, but adapted to turn down and engage behind the end of the matrix-line adjacent to the star-wheel, as shown in dotted lines in Fig. 9, so that when the carriage is moved forward to the left this finger $o$ will push the line before it out of the assembler and through the intermediate guide into the top of the elevator L. The transfer-finger is held in elevated position by a latch $o'$. (See Figs. 11, 12, 14, 17, 18, 19, and 22.) This latch $o'$ is lifted by the manually-operated starting-rod P, mounted to slide vertically in the frame, as shown in Figs. 1, 12, 13, 14, &c., this rod having also additional functions hereinafter described. The transfer-slide O is also provided near its forward end with a rigid depending finger $o^2$, which serves to limit the elongation of the line as it is assembled and to guide the forward end of the line after it has been transferred into the assembler L and while it is being lowered thereby. This front finger $o^2$ is fitted at its upper end into a horizontal groove in the carriage O and secured by a binding-screw $o^3$, which admits of its being fixed at any point in the length of the carriage, according to the length of the line being composed. It will be understood that when the transfer-finger $o$ closes behind the line the latter is confined between the finger $o$ and the finger $o^2$, so that as the carriage moves forward the line will be in compact order as it is transferred to the elevator L.

The forward movement of the line to transfer the line is effected by the upper end of the lever $o^5$, Figs. 1, 11, and 15, operated as hereinafter described.

The transfer-carriage is further provided with a finger $o^4$, as shown in Figs. 11, 12, 13, 14, and 19, the function of which is to push the first matrix-line into the second elevator M from the first elevator L as the new line is transferred to the latter. When the composed line is to be thus transferred from the assembler to the first elevator, it is obvious that the resisting-finger $j$ must move away from the front end of the line and out of its path. This is accomplished as shown particularly in Figs. 12, 13, and 16 and also in Figs. 14 and 18. The finger $j$ is mounted in a vertical pivot $j^3$ on the assembler-slide J, so that it may swing back away from the matrix-line, and it is held normally in position by a vertically-sliding pin $j^4$, also mounted in the slide, and urged upward by a spring $j^5$, as shown in Fig. 12. When the line is to be transferred, the retaining-pin $j^4$ is depressed to release the finger $j$ by means of a lever $j^6$. (Clearly shown in Figs. 12 and 16.) This lever is pivoted at its middle to the slide J and carries at the opposite end a stud traveling in a horizontally-grooved arm $p$ on the vertical starting-rod P, before referred to, so that when this rod is raised to permit the shifting-finger $o$ to fall into engagement with the line it also releases the detent-finger $j$, permitting it to yield before the advancing line. The starting-rod P serves also at the same time to release the transfer-carriage O.

The transfer-carriage O during the assemblage of the line is held from moving to the left, as shown in Figs. 20 and 21, by a hooked latch $o^6$, pivoted in the frame and engaging a shoulder in the carriage. The transfer-finger $o$ has its shaft or pivot provided with a heel or shoulder $o^7$. When the finger $o$ falls to engage the line, this heel acts beneath the dog $o^6$, raising the same, as shown in Figs. 20 and 21, thereby releasing the carriage O, so that it may move to the left with the line. When the line is transferred, it is necessary that the resisting-finger $j$ shall return to its original position near the star-wheel preparatory to the composition of the next line. The starting-lever P is therefore provided, as shown in Figs. 11 and 16, with a lip $p'$, which operates through a lever $p^2$ on the brake or clutch $j^2$, which holds the assembler-slide forward. In this way the slide is released and permitted to return with the finger $j$ to the original position. When it is thus returned, the rear end of the finger encounters a lip $j^8$, whereby the finger $j$ is restored to its operative position, in which it is automatically locked by pin $j^4$, before referred to. As the transfer-slide returns to its original position after carrying the line to the left the shifting-finger $o$ must be raised that the matrices of the new line may enter thereunder. This is accomplished, as shown in Figs. 12, 15, &c., by a fixed rail $o^8$, lying in the rear of the slide and inclined, as shown, its lower end being elastic. As the finger $o$ completes its movement to the left a roller $o^9$ on its rear side rides beneath and beyond the rail $o^8$, the end of which springs down below the level of the roller. When the carriage returns with the finger, the roller of the latter overrides the rail $o^8$, which serves to lift the finger to its highest position, in which it is automatically locked by the latch $o'$, already referred to. The descent of the finger $o$ when released is insured by a spring $o^{10}$, connected therewith, as shown in Fig. 12.

The first elevator L is raised and lowered, as shown in Fig. 2, by lever $l$ on the end of a horizontal shaft $l'$, seated in the main frame and extended rearward, its rear end being provided with a lever $l^2$, receiving motion, as shown in Figs. 1, 3, and 4, through a vertical slide $l^3$ from a cam $l^4$ on the horizontal main shaft Q. The second elevator M receives motion through link $m$ on the forward end of a lever $m'$, which is extended rearward and upward, mounted loosely on a pivot in the main frame and acted upon at its rear end by cam $m^2$ on the main shaft. The cams are so formed and timed that the two elevators stand in line at the top, as shown in Fig. 2, while the newly-composed line is being transferred from the assembler into the elevator L and the preceding line, which has served its purpose, is being transferred from the elevator L to the second elevator M, after which the assembler L descends with the new line to the casting position, while the assembler M rises with the dead-line until it is in position to be transferred to the intermediate channel R, Figs. 1 and 2, in which the teeth of the matrices are engaged with a toothed rib on the elevator S, by which the line of matrices is lifted to a distributing mechanism at the top of the machine, leaving the spacers behind to be pushed to the right into their magazine I, as in the Mergenthaler machine, this transfer first of the line and thereafter of the spacers being effected by devices identical with those in the Mergenthaler machine and foreign to my invention.

The casting mechanism with which the line coöperates when lowered by the first elevator consists, as shown in Figs. 3 and 5, of a vertically and horizontally movable slotted mold T and of a swinging melting-pot U, provided with the usual delivery-mouth and a plunger for forcing the metal therethrough into the mold.

The composed line is lowered into position between the confining-jaws $a$ $a$, which may be constructed and operated in the usual way to confine the line endwise between them and determine its length when justified. When the matrices are in this position, (indicated by dotted lines in Fig. 5,) the front face of the mold is closed against the matrices and the mouth of the pot closed against the rear face of the mold, as usual in this class of machines.

The mold T is mounted to slide vertically on guides $t$, rising from a slide $t'$, mounted to move horizontally forward and backward in the main frame. This movement is secured by an arm on its rear end provided with a lateral roller or stud $t^2$ entering a cam-groove $t^3$ in the side face of the cam-wheel on the main shaft Q, whereby the mold is crowded forward against the matrices preparatory to the casting operation and thereafter retracted in order to draw the type characters on the contained linotype out of the matrices. After the casting action the mold descends to a point below the pot and opposite the horizontal knives V, between which the slug or linotype is driven by the ejector W into the galley X. This vertical movement of the mold is secured through a connecting-rod $t^6$, mounted on a horizontal axis in the main frame and acted upon at its rear end, as shown in Fig. 7, by a cam $t^7$, the mold descending by gravity and being raised by the lever. The ejector-blade W is guided in the horizontal mold-carrying slide $t'$ and receives motion through link $w$ from an arm $w'$, turning loosely on the main shaft and connected by link $w^2$ with an upright lever $w^3$, mounted in the main frame and provided with a stud or roller $w^4$, through which it receives motion from a cam-groove $w^5$ in a cam on the main shaft. The movement of the ejector-blade and the mold-slide in which it is carried are independent of each other. After the casting operation and after the mold has reached its lowest position it remains at rest, while the ejector-blade advancing from the rear expels the linotype or slug and drives it between the side trimming-knives V, after which the ejector is retracted preparatory to the rise of the mold to the casting position.

For the purpose of trimming the base of the linotype contained in the mold that it may be exactly type high a trimming-knife V' is fixed to the mold-guide $t$, as shown in Figs. 5, 9, 10, &c., so that the rear surface of the descending mold shall be carried closely past its edge in order that the base of the slug may be trimmed flush with the face of the mold. The knife stands in an oblique position with reference to the length of the mold, as shown in Fig. 10, so that it may have a shearing action. It is secured by adjusting-bolts, as shown.

The melting-pot U is supported by legs turning on a horizontal pivot-pin $u$, Fig. 5, as usual. It falls back from the mold when released by gravity and is pushed forward by the periphery of a cam $u'$, mounted in the main frame and acting on a roller in arm $u^2$, which is pivoted to the rear side of the pot with a spring under one end, so that the cam will exert a yielding pressure. The plunger in the pot for delivering the metal as usual is actuated by an angular lever $u^4$, pivoted near its middle to the main frame, this lever being depressed by a spring $u^5$ and raised by a cam $u^6$ on the main shaft acting on its rear end.

When the matrix-line is before the mold, it is necessary that the spacers should be pushed forward through the line to effect justification. This is done, as shown in Fig. 5, by a vertically-movable justification bar or pusher $a^2$, operated through rods $a^3$ and levers $a^4$. These levers are pushed forward by springs $a^5$ and depressed by cams $a^6$ on the main shaft.

After the linotypes or slugs are pushed into the galley, as heretofore described, it is necessary that they should be pushed downward to make room for those which are to follow. I therefore provide the galley, as shown in Fig. 2, with a supporting-slide $x^2$, upheld by friction-springs, and I provide the first elevator L, as shown in Fig. 5, with an arm $l^5$, which acts at each descent of the elevator on the top of the column of slugs, pushing the same downward.

The distributing mechanism, to which the dead-line of matrices is lifted by the elevator S, already referred to, may be of the same construction as that employed in the ordinary Mergenthaler machine, consisting mainly of a fixed horizontal bar having on the lower edge permuted teeth to sustain the matrices as they are carried along by horizontal screws until they arrive over their proper channels in the magazine.

I believe myself to be the first to construct a linotype-machine in which the first elevator serves only to lower the composed line from the assembling-level to the mold; also, the first to produce a machine in which the composed line of matrices and spacers is transferred from the devices which present it to the mold to mechanism for lifting the line above the assembling-level preparatory to the separation of the matrices and spacers, and it is manifest that the details of these mechanisms may be variously modified without passing beyond my invention. I also believe myself to be the first to construct a machine in which the mold is arranged to descend from the casting-point to present the slug to the ejector below the level of the pot, and also the first to mount the mold to slide upward and downward on a slide having a forward-and-backward motion. The details of these parts may also be modified.

What I claim as my invention is—

1. In a linotype-machine, the horizontal assembler-slide J and the resisting-finger $j$ pivoted thereto to yield horizontally, and extended rearward beyond its pivot, in combination with the spring-actuated locking-pin $j^4$, means for retracting the pin to release the finger, and an abutment $j^8$ for restoring the finger to its operative position.

2. In a linotype-machine, the assembler-slide J, a resistant $j$ pivoted thereto, means for locking the resistant in operative position, a brake to retain the assembler-slide as it is moved forward by the growing line of matrices, and a releasing device P, common to the resistant and the brake.

3. In a linotype-machine, the assembler-slide J, provided with the finger $j$, turning on a vertical axis, and the transfer-finger $o$, mounted on the transfer-slide and turning on a horizontal axis, in combination with means for automatically controlling the action of said fingers.

4. In a linotype-machine and in combination with means for supporting the matrix-line, the assembler-slide J, provided with the pivoted resisting-finger $j$, the vertically-movable transfer-finger $o$, mounted on the transfer-slide, means for controlling the action of said slides and fingers, and the finger $o^2$ on the transfer-slide, whereby the line is confined between the fingers $o$ and $o^2$ during the retreat of the finger $j$.

5. In a linotype-machine, the line-transferring carriage O, provided with finger $o^2$ and the pivoted line-shifting finger $o$, in combination with the assembler-slide J mounted therein and provided with the pivoted finger $j$, and automatic controlling devices for the pivoted fingers.

6. In a linotype-machine, a line-transferring carriage O, provided with fingers $o^2$ and $o^4$, and the vertically-swinging shifting-finger $o$, in combination with the assembler-slide mounted in said carriage and provided with means for resisting the forward end of the matrix-line.

7. In a linotype-machine and in combination with a line-transferring slide O, provided with a vertically-movable finger $o$ to act behind the newly-composed line, the finger $o^2$ to act in front of said line, and the finger $o^4$ to act behind the preceding line, whereby the first line is advanced to make room for the second.

8. In a linotype-machine and in combination with the line-shifting slide or carriage, the line-shifting finger $o$, connected to the slide by a pivot lying at right angles to the line of movement, automatic devices, substantially as shown, for turning the finger upward and downward, that it may shift the composed line forward and thereafter rise and return over the line.

9. In a linotype-machine, in combination with the assembler-slide J, the resisting-finger $j$, connected to the slide by a vertical pivot, a latch-bolt $j^4$ to hold the finger in operative position, means for disengaging the bolt when the line is moved forward, and means for restoring the finger to its operative position when the assembler-slide retreats.

10. In combination with the transfer slide or carriage O, a latch $o^6$ to lock the same in its normal position, a line-shifting finger $o$ pivoted to the slide, and a latch-tripping device connected with said finger, whereby the engagement of the shifting-finger behind the line is caused to disengage the slide and permit its movement to effect the transfer.

11. In a linotype-machine and in combination with a line-transferring slide, the finger $o$ pivoted thereto to engage behind the composed line, the latch $o'$ to hold the finger in its elevated inactive position, and a rail or guide $o^8$ to lift the finger from its operative position.

12. In a linotype machine and in combination with the line-shifting slide O, the finger $o$ pivoted thereto, the spring $o^{10}$ acting to turn the same downward, the latch $o'$ to hold the finger in its elevated position, and the rail $o^8$ to raise the finger as the slide retreats.

13. In a linotype-machine, an elevator or carrier for presenting the composed line of matrices to the mold, a second elevator for transferring the line to the distributing devices, and means for shifting the line from the first elevator to the second at the composing-level, whereby the first elevator is left in position to receive the succeeding line.

14. In a linotype-machine, mechanism for composing a line of matrices, an elevator for carrying the said line to the mold, means for transferring the composed line in a straight path to said elevator, a second elevator for transferring the line to the distributing devices, and means for transferring the line from the first elevator to the second.

15. In a linotype-machine, two elevators or carriers for the composed lines of matrices, arranged one to descend and the other to rise from a common line, in combination with means for carrying one line of matrices out of the first elevator into the second at the same time that a second line is carried into the first elevator.

16. In a linotype-machine, vertically-movable elevators L and M, channeled to receive the composed lines of matrices, in combination with means for bringing their channels in line and thereafter moving one elevator downward and the other upward, and means for carrying a line of matrices into one elevator and at the same time carrying the preceding line from said elevator to the other.

17. In a linotype-machine, means for assembling a line of matrices, means for shifting the line endwise in a straight path when completed, a vertically-movable carrier or elevator to receive the line when shifted as above and thereafter present the same to the mold, a second elevator or carrier for presenting the line to the distributing mechanism, and means for transferring the line from the first elevator to the second subsequent to the casting action.

18. In a linotype-machine and in combination with two elevators, L and M, movable in opposite directions from a common line, a line-shifting carriage provided with means for transferring a newly-composed line into the elevator L, and also with means for transferring a preceding line from said elevator to the elevator M.

19. In a linotype-machine, in combination with a melting-pot, means for supporting a line of matrices in opposition thereto, an intermediate mold, means for lowering the mold from the casting position, and an ejector underlying the pot to drive the slug or linotype from the mold.

20. In a linotype-machine, the combination of a melting-pot and mold to coöperate therewith, vertical guides on which the mold is mounted to descend from the casting position, means for raising and lowering the mold on said guides, an ejector underlying the pot, and means for advancing the ejector when the mold is in its lower position.

21. In a linotype-machine, the combination of the melting-pot, the mold, a horizontal slide underlying the pot and carrying vertical guides to support the mold, means for raising and lowering the mold, and an ejector-slide mounted in the first-named slide.

22. In a linotype-machine, a horizontal slide $t'$, provided with vertical guides for the mold and with horizontal guides for the ejector-blade.

23. In a linotype-machine, the horizontal slide $t'$, provided with upright guides carrying the mold and also provided with a knife $V'$ to trim the base of the slugs.

24. In a linotype-machine and in combination with the melting-pot, a mold mounted to move horizontally to and from the pot and also mounted to move vertically downward from the casting position, in combination with a base-trimming knife $V'$ lying below the mouth of the pot, whereby the base of the slug is trimmed without danger of the shavings falling between the pot and the mold.

25. In a linotype-machine, in combination with the slug-receiving galley X and a yielding support for the slugs, the line elevator or support L, provided with an arm $l^{15}$ to depress the column of slugs.

26. In a linotype-machine, a line-assembling mechanism, a pot, a mold, an ejector, and an elevator or support for presenting the line to the mold, all located in a common vertical plane, means for transferring the composed line to said elevator, a second elevator located beyond the one first named, and means for transferring the composed line from the first elevator to the second.

In testimony whereof I hereunto set my hand, this 23d day of January, 1903, in the presence of two attesting witnesses.

JOHN S. THOMPSON.

Witnesses:
OTTO A. JASORKA,
G. E. KATT.